United States Patent
Gopinath et al.

(10) Patent No.: US 11,493,749 B2
(45) Date of Patent: Nov. 8, 2022

(54) ENHANCED RESPONSE TIME OF TUNABLE OPTICAL ELECTROWETTING ELEMENTS WITH SHAPED INPUT VOLTAGE FUNCTIONS

(71) Applicant: The Regents of the University of Colorado, Denver, CO (US)

(72) Inventors: Juliet T. Gopinath, Boulder, CO (US);
Victor M. Bright, Boulder, CO (US);
Mo Zohrabi, Boulder, CO (US);
Omkar D. Supekar, Boulder, CO (US);
Robert H. Cormack, Erie, CO (US);
Wei Yang Lim, Boulder, CO (US)

(73) Assignee: Regents of the University of Colorado, a body corporate, Denver, CO (US)

( * ) Notice: Subject to any disclaimer, the term of this patent is extended or adjusted under 35 U.S.C. 154(b) by 605 days.

(21) Appl. No.: 16/288,176

(22) Filed: Feb. 28, 2019

(65) Prior Publication Data
US 2019/0265460 A1    Aug. 29, 2019

Related U.S. Application Data

(60) Provisional application No. 62/636,275, filed on Feb. 28, 2018.

(51) Int. Cl.
*G02B 26/00* (2006.01)
*G02B 3/12* (2006.01)
*G02B 3/14* (2006.01)

(52) U.S. Cl.
CPC .............. *G02B 26/005* (2013.01); *G02B 3/12* (2013.01); *G02B 3/14* (2013.01); *G02B 2207/115* (2013.01)

(58) Field of Classification Search
CPC .......... G02B 26/005; G02B 3/12; G02B 3/14; G02B 2207/115
USPC ........................................................ 359/665
See application file for complete search history.

(56) References Cited

U.S. PATENT DOCUMENTS

2012/0216863 A1*   8/2012   Wen ...................... G02B 5/06
                                                      136/259

OTHER PUBLICATIONS

Supekar et al. ("Enhancing the Response Time of Electrowetting Lenses Using Voltage Shaping," in Conference on Lasers and Electro-Optics, OSA Technical Digest (online) (Optical Society of America, 2017), paper SM4C.7 (Year: 2017).*
Supekar, Omkar D., et al. "Enhancing the response time of electrowetting lenses using voltage shaping." 2017 Conference on Lasers and Electro-Optics (CLEO). IEEE, 2017.
Annapragada, S. Ravi, et al. "Dynamics of droplet motion under electrowetting actuation." Langmuir 27.13 (2011): 8198-8204.

(Continued)

*Primary Examiner* — Marin Pichler
*Assistant Examiner* — Mitchell T Oestreich
(74) *Attorney, Agent, or Firm* — Macheledt Bales LLP; Jennifer L. Bales

(57) ABSTRACT

A tunable optical electrowetting element having a liquid-liquid interface shape controlled by an applied voltage. Circuitry for applying a voltage to the electrowetting element is configured to apply a shaped voltage signal comprising a first fast-rising signal combined with a second fast-rising signal. The second signal is selected to damp oscillations in the liquid-liquid interface caused by the first signal.

22 Claims, 5 Drawing Sheets

(56) References Cited

OTHER PUBLICATIONS

Lim, Wei Yang, et al. "Liquid Combination with High Refractive Index Contrast and Fast Scanning Speeds for Electrowetting Adaptive Optics." Langmuir 34.48 (2018): 14511-14518.

Supekar, Omkar D., et al. "Enhanced response time of electrowetting lenses with shaped input voltage functions." Langmuir 33.19 (2017): 4863-4869.

Wang, K-L., and T. B. Jones. "Electrowetting dynamics of microfluidic actuation." Langmuir 21.9 (2005): 4211-4217.

Cui, Weiwei, et al. "Dynamics of electrowetting droplet motion in digital microfluidics systems: from dynamic saturation to device physics." Micromachines 6.6 (2015): 778-789.

Tröls, Andreas, Stefan Clara, and Bernhard Jakoby. "Fluid dynamics of an electrowetting-on-dielectrics tube oscillator." Procedia engineering 120 (2015): 189-193.

\* cited by examiner

ENHANCED RESPONSE TIME OF TUNABLE OPTICAL ELECTROWETTING ELEMENTS WITH SHAPED INPUT VOLTAGE FUNCTIONS

This invention was made with government support under grant numbers N00014-15-1-2739 awarded by the Office of Naval Research, DBI1353757 and CBET 1631704 awarded by the National Science Foundation, and W31P4Q-14-1-0006 and W31P4Q-14-1-0004 awarded by DOD/DARPA. The government has certain rights in the invention.

U.S. patent application Ser. No. 15/449,975, filed Mar. 5, 2017 is incorporated herein by reference.

BACKGROUND OF THE INVENTION

Field of the Invention

The present invention relates to tunable optical electrowetting elements. In particular, the present invention relates to such elements achieving improved response time via shaped input voltage functions.

Discussion of Related Art

The electrowetting on dielectric (EWOD) principle enables the control of the shape of a liquid droplet or liquid-liquid interface on a dielectric surface through an applied voltage. The result is an ultra-smooth, tunable liquid interface that is an ideal platform for tunable lenses and prisms. Devices based on the EWOD principle are appealing due to their low power consumption, large range of tunability, and lack of mechanical moving parts. Recently, an optical switch with a high rejection ratio has been demonstrated with this technology. Other applications include optical displays, lab-on-a-chip systems, and micro-total analysis systems for biological applications such as polymerase chain reactions, DNA enrichment, and cell-assays. Understanding the temporal dynamics of EWOD devices, especially the response time, is important for many applications. Recently, microscopes incorporating EWOD lenses have been demonstrated, enabling nonmechanical depth scanning. EWOD lenses and prisms have also been used for nonmechanical beam steering and show promise for LIDAR and remote sensing applications. The technology also shows promise for consumer market applications such as optical switches for communications, and display technologies. However, achieving fast response times of these devices is one of the main challenges. For instance, a typical confocal microscope uses a pair of galvanometer mirrors for 2D lateral scans at kHz speeds. Using a liquid lens in such a microscope would allow for a large depth scan, however, the response time of such an element needs to be comparable to the lateral scanning speed.

Another example of a different technology is optical switches based on digital micromirror devices (DMD). These optical switches have been developed and used for wavelength division multiplexing with a switching time of 15 μs. To replace mechanical optical switches, EWOD devices need a path to comparable response time.

In order to optimize the response of EWOD devices, it is imperative to study the dynamics of the liquid motion upon actuation. This dynamic behavior of EWOD actuation has been studied for droplet spreading, capillary flow, and lenses, with particular emphasis on numerical modeling the actuation dynamics along with understanding the material properties and dimensional dependence of the actuation dynamics. For example, it was experimentally determined that the response time of the droplet under EWOD actuation has a $r^{1.5}$ dependence, where r is the initial droplet radius, and the response of the droplet spreading can be changed from under-damped to over-damped by increasing the viscosity of the droplet.

A need remains in the art for apparatus and methods to improve the response of EWOD devices by applying shaped input voltage functions.

SUMMARY OF THE INVENTION

It is an object of the present invention to provide apparatus and methods to improve the response of EWOD devices by applying shaped input voltage functions.

Apparatus according to the present invention comprises a tunable optical electrowetting element having a liquid-liquid interface shape controlled by an applied voltage and circuitry for applying a voltage to the electrowetting element configured to apply a voltage signal comprising a first fast-rising voltage signal (defined as fast enough to cause an under-damped response, aka ringing) combined with a second distinct fast-rising signal configured to cancel out a substantial part of the ringing caused by the first fast-rising signal. In preferred embodiments one or both of the signals are nonlinear signals. In preferred embodiments, one or both signals are exponential signals. One of the signals may be delayed with respect to the other.

The EWOD device might be a lens or a prism. The signals can be linear or nonlinear. The two signals are selected such that the second voltage signal damps the oscillations at the liquid-liquid interface caused by the first voltage signal. In preferred embodiments one or both of the signals are exponential signals. In some embodiments one of the signals is delayed in tame with respect to the other.

The EWOD device can be a lens (1-electrode) or a multi-electrode EWOD device. In some embodiments an AC carrier frequency is applied to the shaped DC voltage signal to increase the life of the device. The AC frequency is higher than the response of the liquids in the device hence does not substantially affect the liquid-liquid interface in the EWOD device, but does prevent ions from being injected in a dielectric layer of the device.

In specific examples, cylindrical lenses with inner diameter 2.45 and 3.95 mm were used to characterize the dynamic behavior of the liquids under DC voltage electrowetting actuation. The two liquids were 1 wt. % SDS water solution and dodecane. For the 3.95-mm inner diameter lens, the present invention achieved a response time improvement of 29% when compared with the fastest response obtained using single exponential driving voltage.

An embodiment is based on the response time of a cylindrical geometry EWOD lens and its dependence on DC input voltage. Other embodiments include EWOD prisms, and devices wherein the shaped input DC voltage includes an AC carrier frequency too high for the liquid to respond to the oscillations, but sufficient to increase the life of the devices (because ions do not collect in one portion of the device). The RMS of the signal is a similar shape to the DC-only signal.

A combination of two or more nonlinear functions having different rise time is used as the input voltage function. For example, two exponential voltage functions having different rise times or a time delay between them. This results in a faster, smoother, response time in the EWOD devices.

DETAILED DESCRIPTION OF THE INVENTION

Figure 1:
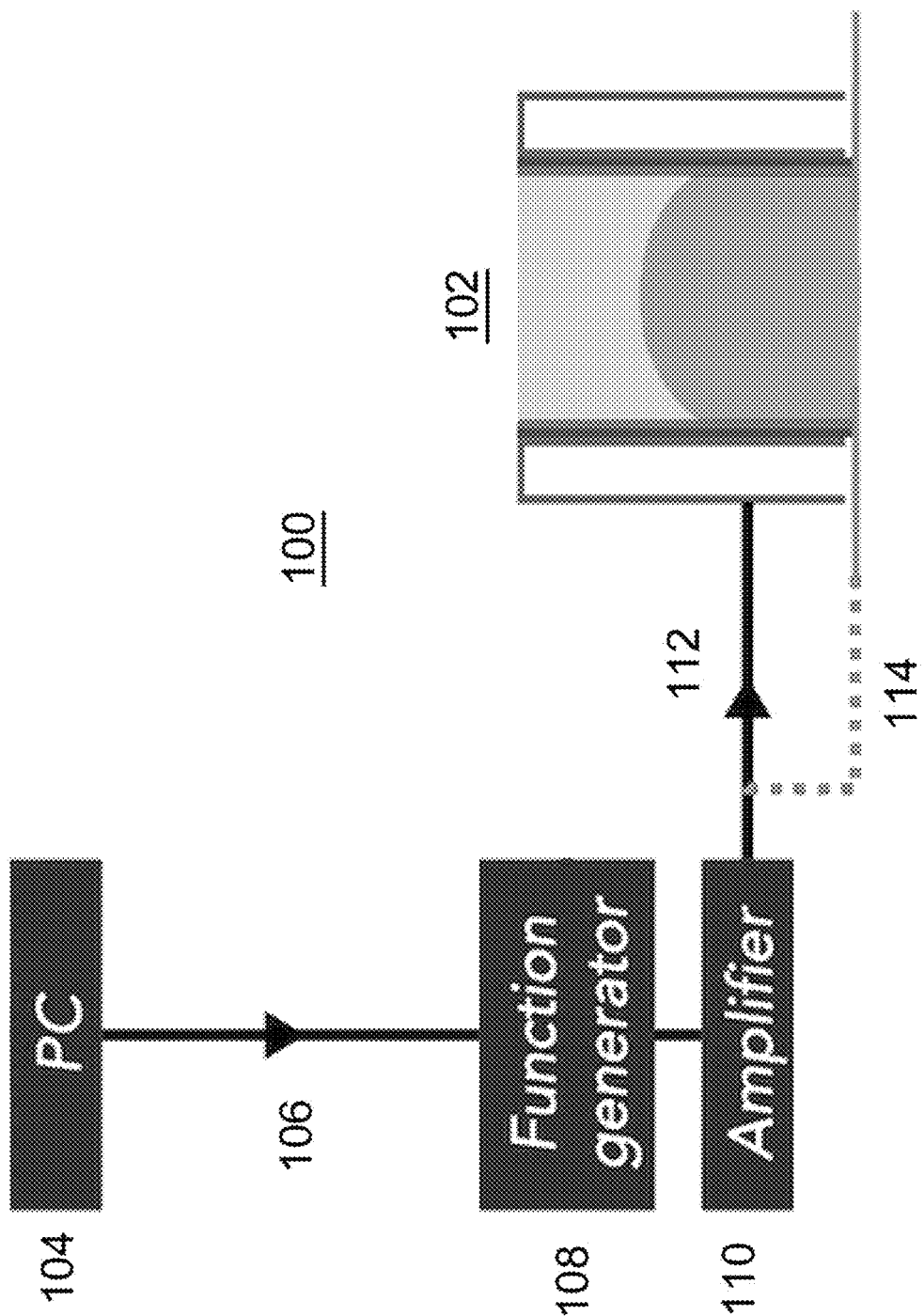
FIG. 1 is a schematic block diagram of an embodiment of the present invention, including an EWOD lens and voltage signal circuitry.
Figure 2A:
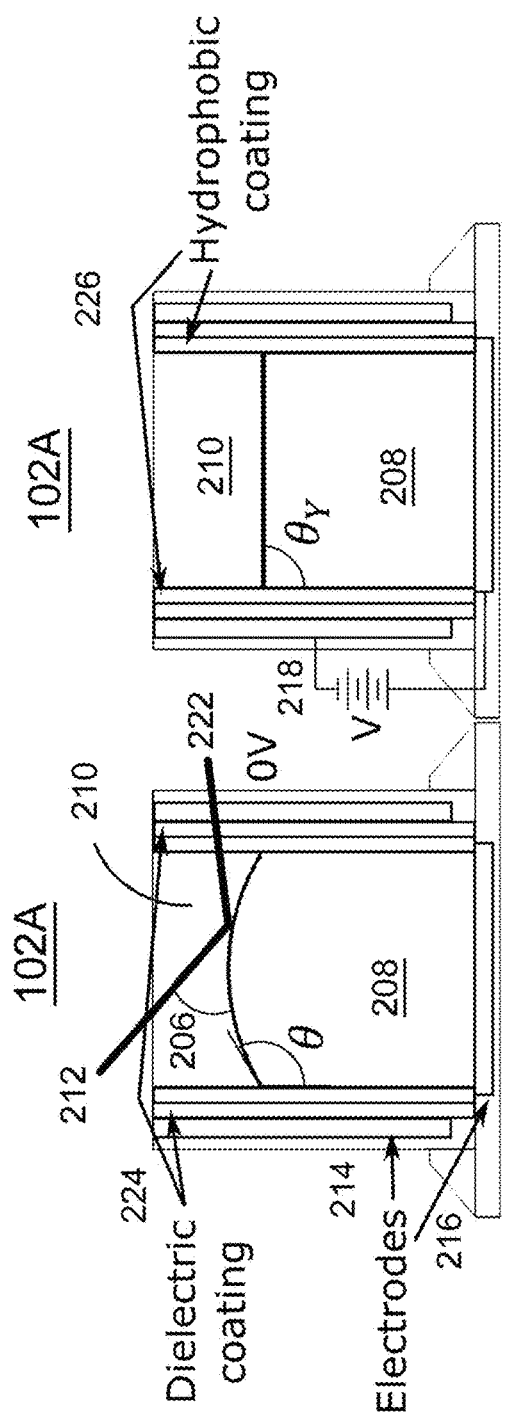
FIGS. 2A, 2B, and 2C are detailed diagrams of EWOD devices and associated voltage signal levels.
Figure 2B:
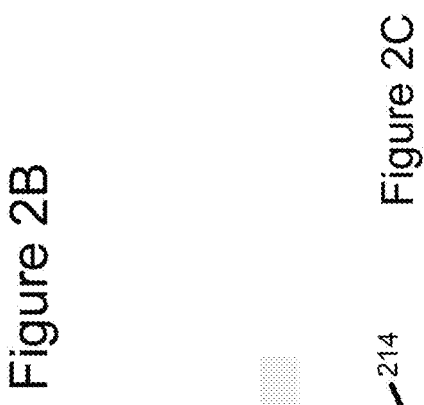

FIG. 1 is a schematic diagram of an embodiment of the present invention comprising an EWOD device 102 and control circuitry, including processor 104 controlling function generator 108 via signal 106, and amplifier 110 for amplifying the voltage function and providing it to side and base electrodes (better shown in FIGS. 2A and 2B). In an experimental setup along these lines, the shaped voltage input was generated using an Agilent 33250A function generator amplified to drive EWOD lens. The EWOD shown in FIG. 1 is a lens, but the present invention applies to various types of EWOD devices.

The liquid-liquid interface in the EWOD responds to a change in applied voltage 112, 114 by changing its shape. Lenses have greater or less curvature (and hence power), prisms tilt according to the voltage, etc. The response time of any given EWOD device depends on a number of factors, including the physical characteristics of the two fluids used and the cell configuration and materials. Two experimentally determined examples are given here, but those skilled in the art of EWOD device will appreciate that combinations of signals to drive each device may be determined experimentally or by extrapolation from known devices.

Figure 2C:
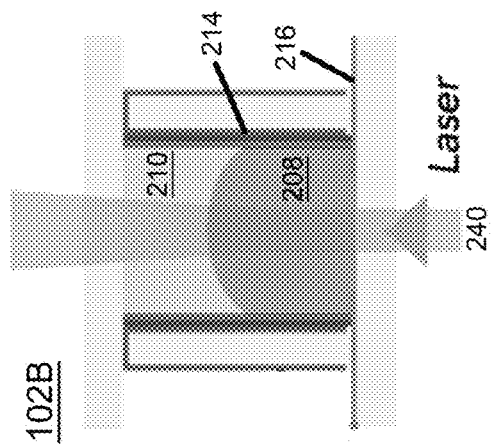

FIGS. 2A-2C are detailed diagrams of examples of EWOD lens 102 of FIG. 1 at varying voltage signal levels. FIGS. 2A and 2B show device 102A operating in reflective mode (as a mirror, for example as part of a switch or as an approximation of a prism), While FIG. 2C shows device 102B operating as a concave lens with beam 240 entering from below.

Cylindrical glass tubes (inner diameters of 2.45 and 3.95 mm corresponding to heights of 3 and 5 mm, respectively) were used to construct electrowetting lenses embodiments. Cylindrical glass tube 224 is sputter-coated with a 300 nm Indium Tin Oxide (ITO) layer 214. Next, the sidewalls of the tubes are coated with a 1 μm Parylene HT using vapor phase deposition (Specialty Coating Systems). The devices are dip coated in a 1 wt % solution of Teflon 226 (DuPont AF1600) in Fluorinert FC-40 and cured at 170° C. for 20 min. The glass tube is epoxy bonded to an optical window that is patterned with an annular Titanium/Gold/Titanium (Ti/Au/Ti) electrode 216, which serves as the ground electrode for the lens. The lenses are filled with the polar liquid 208 (1% SDS solution) followed by the non-polar liquid 210 (dodecane).

In FIG. 2A, at a first voltage (e.g. 0V) lens 102 is un-activated, and forms a concave surface. An input beam 212 is shown reflected as beam 222. In FIG. 2B, when a second, nonzero voltage is applied, the liquid-liquid interface flattens out and the beam is reflected at a different angle. Thus the optical power of the lens is determined by the voltage applied. In FIG. 2C, device 102B is operating as a concave lens. As in the previous example, changing the applied voltage 218 changes the power of the lens. If beam 240 were entering from the top, 102B would operate as a convex lens.

Figure 3:
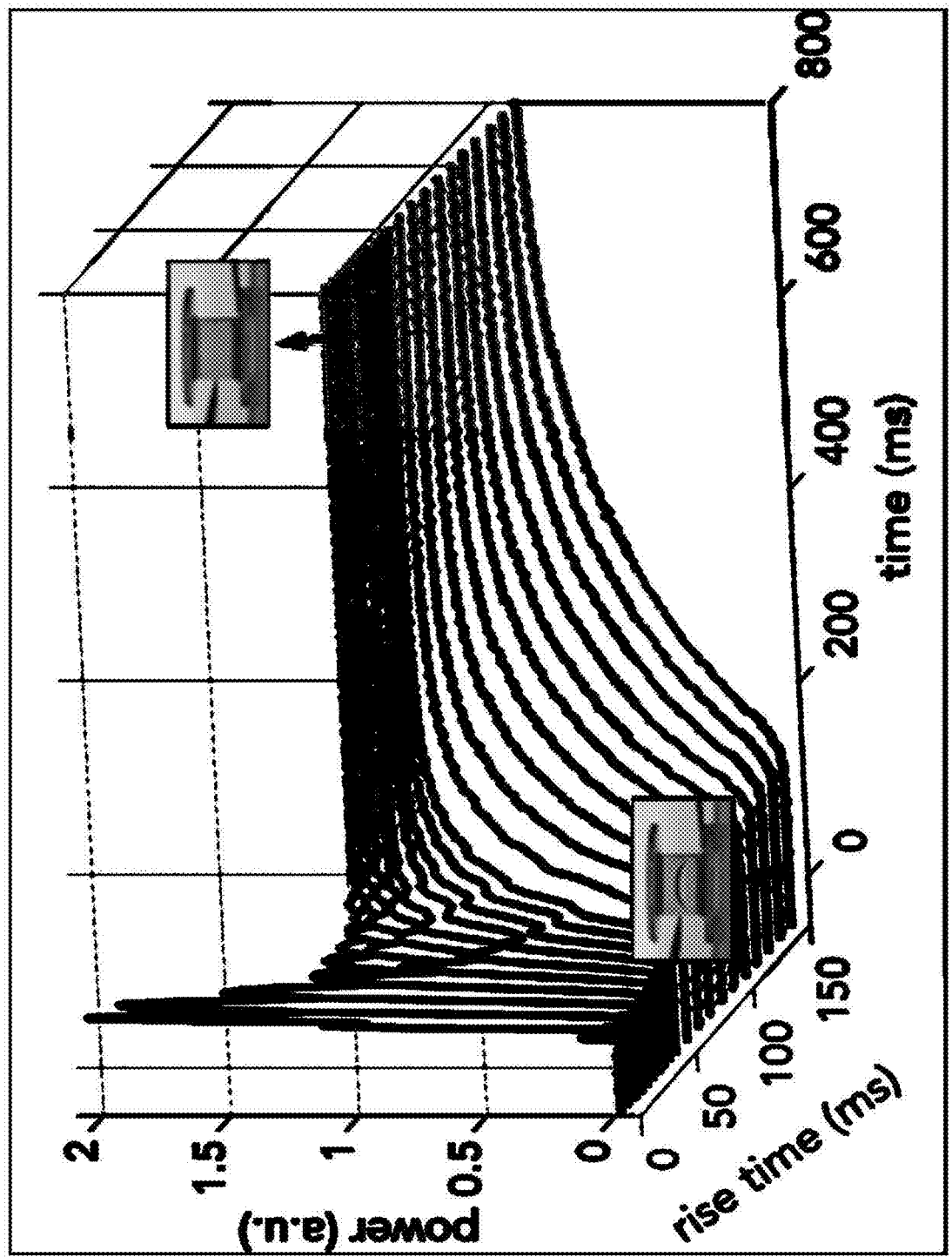
FIG. 3 is a plot showing the liquid-liquid interface response to fast-rising and slower-rising voltage signals.

FIG. 3 is a plot showing the response of an EWOD to slow and fast rise-time voltage signals. In under-damped systems, changing the applied voltage 218 too quickly (as in a step voltage) results in overshoot and oscillation in the liquid-liquid interface. This is termed herein a "fast-rise" signal. This is seen in the signals shown in the left/back of FIG. 3, where there is overshoot and ringing. Raising the voltage more slowly, for example with a single exponential function with a slow rise time, can result in a gradual response with no oscillations, but is still slower than desired. This is seen in the signals shown in the front/right of FIG. 3, where there isn't any overshoot. Even the critically damped case (fastest rising without overshoot) is too slow for desired applications.

Figure 4:
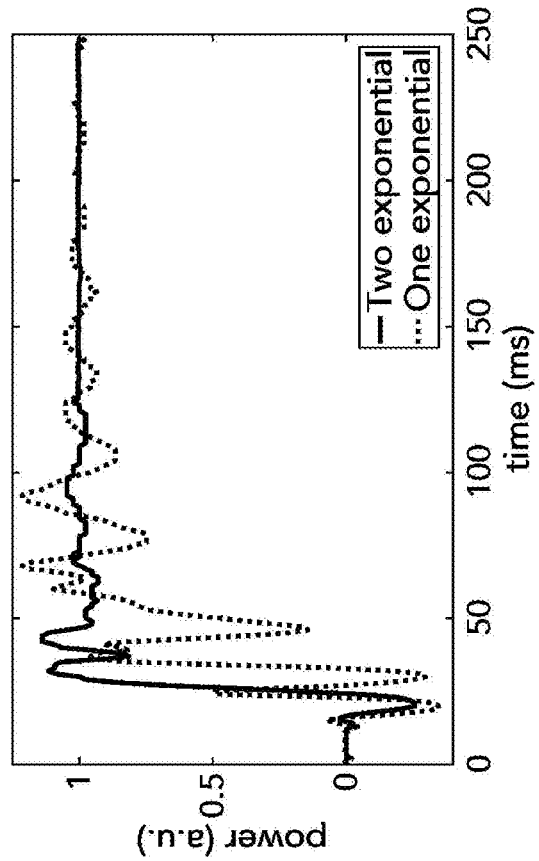
FIG. 4 is a plot showing a single exponential voltage signal and a combined exponential voltage signal.
Figure 5:
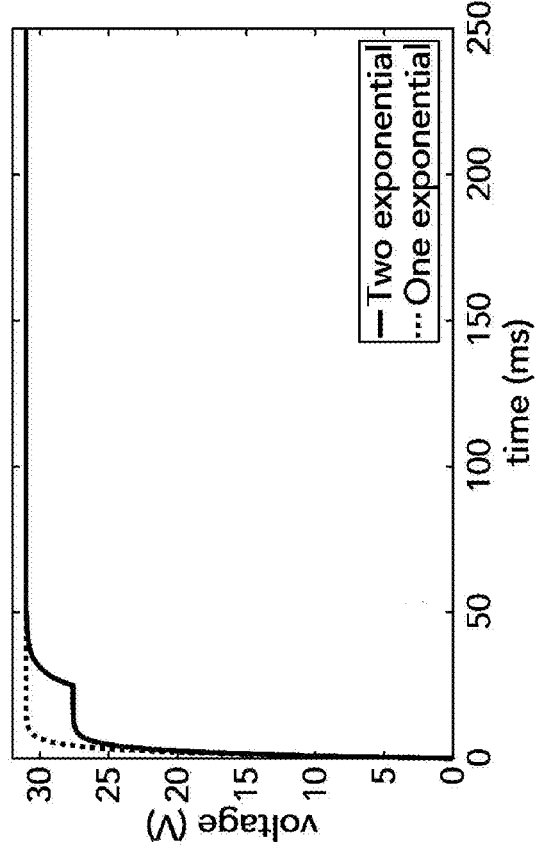
FIG. 5 is a plot showing the response time of the EWOD lens of FIGS. 1-2B.

FIGS. 4 and 5 illustrate the improved response according one embodiment of the present invention, combining two exponential signals having offset rise times. To improve the response time of EWODs, an embodiment uses a two-exponential driving voltage as depicted in FIG. 3 as a solid line. A 3.95-mm inner diameter lens was driven from an initial contact angle of 155° at 0 V to 90° at 31 V.

The single exponential driving voltage (dotted line) has a rise time of 2 ms with an amplitude of 31 V. In the two exponential case, the two rise times are 2 ms and 5 ms (solid line). Specifically, the exponential rise time of 2 ms went from 0 to 27.6 V with a width of 25 ms and the exponential rise time of 5 ms to reach 31 V. The significant reduction in the response time can be explained through the destructive interference of two standing waves generated by the two exponential rise time functions. The first 2 ms input rise time function generates a rapid contact line motion which generates a standing wave moving from the sidewall towards the axis of the lens, which upon reflection starts propagating towards the sidewall. The second 5 ms input rise time function generated after a delay generates another standing wave that moves towards the axis of the lens and destructively interferes with the first wave, and dampens the oscillations at the liquid-liquid interface.

FIG. 5 shows experimental results for single and combined exponential driving voltage. The solid line shows the fastest response time of 98 ms. Using a single 2 ms exponential drive voltage results in a response time of 167 ms (dashed line).

Using two exponential driving voltages improves the response time by 41% due to suppressing the oscillations hence decreasing the response time.

The present invention provides a shaped voltage signal formed by combining two distinct signals. For example the voltage combines two nonlinear functions having different rise times in order to achieve a much better (faster and cleaner) response. The first signal moves the interface quickly, while the second signal damps the oscillations caused by the first signal. FIG. 4 is a plot showing a first voltage signal comprising a single exponentially rising voltage (dotted line), along with a signal according to the present invention, comprising a combination of a two exponential functions (solid line). FIG. 5 shows the EWOD response time for each voltage signal. The dotted line is the liquid-liquid interface response to the single exponential voltage signal. It rises quickly but generates a lot of oscillations at the liquid-liquid interface; hence the response doesn't settle sufficiently (defined as less that 2.5% variation) for 167 ms. The solid line is the liquid-liquid interface response to the combined exponential voltage signal according to the present invention. The rise time is just as quick, but the oscillations are substantially damped. Thus, the signal settles in 98 ms. In the two embodiments described in conjunction with FIGS. 2A and 2B, the improvement is 29% and 41% respectively. This is a 41% improvement compared to the 2 ms single exponential drive and a 29% improvement compared to the fastest response obtained for the 3.95 mm inner diameter lens driven using a single exponential input voltage with a rise time of 15 ms. In addition to this improvement in the response time, the oscillations are suppressed, making the lens behave more like a critically damped system.

Figure 6:
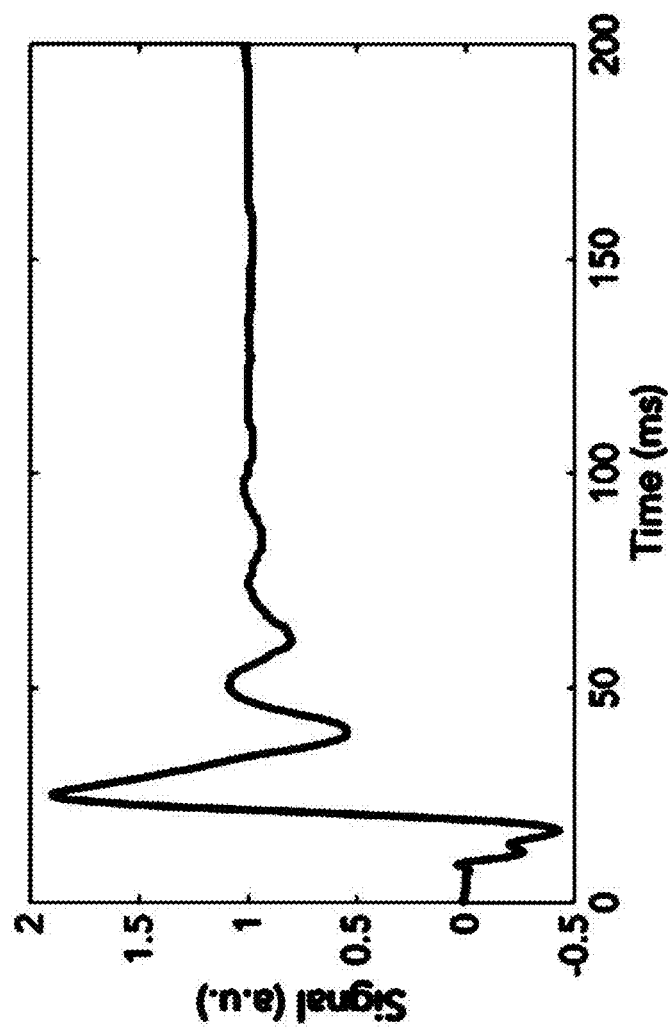
FIG. 6 is a plot illustrating EWOD response with the addition of an AC carrier frequency to the underlying DC shaped voltage signal.

FIG. 6 is a plot illustrating the addition of an AC carrier frequency to an underlying DC activating voltage signal. In this case, a 3 kHz carrier frequency was added to a step increase. The RMS of the signal is very similar to the underlying DC signal, and hence the response is also very similar. As expected with a step increase signal, significant ringing occurs. According to analysis by the present inventors, adding an AC carrier frequency to shaped DC signals as described above results in RMS signals having a similar shape, and the response time is similarly improved.

This is because the AC frequency is higher than the response of the liquids in the device hence does not substantially affect the liquid-liquid interface in the EWOD device, but does prevent ions from being injected in dielectric layer of the device. FIG. 6 shows the lens response for a lens driven with AC voltage using a 3 kHz carrier frequency. The liquids used in this case are DI water and 1-phenyl 1-cyclohexene. The rms voltage was changed as a step voltage function to change the contact angle from 173 deg to 90 deg.

While the exemplary preferred embodiments of the present invention are described herein with particularity, those skilled in the art will appreciate various changes, additions, and applications other than those specifically mentioned, which are within the spirit of this invention. For example, employing a genetic-algorithm tool will further enhance the optimization process.

What is claimed is:

1. An improved tunable optical electrowetting device comprising:
    a tunable optical electrowetting element having a liquid-liquid interface shape controlled by an applied voltage;
    circuitry for applying a voltage to the electrowetting element, the circuitry configured to apply a shaped voltage signal by combining a first fast-rising voltage signal and a second, distinct, fast-rising voltage signal;
    wherein each fast-rising signal rises fast enough that it would cause an under-damped response in the electrowetting element on its own; and
    wherein the second signal is selected to reduce the ringing caused by the first signal by more than three times.

2. The device of claim 1 wherein the second signal is offset in time from the first signal.

3. The device of claim 1 wherein one of the signals is faster-rising than the other signal.

4. The device of claim 1 wherein one of the signals is a nonlinear signal.

5. The device of claim 4 wherein one of the signals is an exponential signal.

6. The device of claim 4 wherein both of the signals are nonlinear signals.

7. The device of claim 6 wherein both of the signals are exponential signals.

8. The device of claim 7 wherein the signals are offset in time.

9. The device of claim 7 wherein the response time is improved by at least 29% over using a single signal comprising an exponential signal having the same rise time as the first fast-rising signal.

10. The device of claim 1 wherein the electrowetting element is an EWOD lens.

11. The device of claim 1 wherein the electrowetting element is an EWOD prism.

12. The device of claim 1 wherein the circuitry for applying a voltage is further configured to apply an AC carrier frequency to the shaped voltage signal, and wherein the AC carrier frequency is too high to cause ringing in the liquid-liquid interface of 75% or more of the desired final value.

13. The method of tuning an optical electrowetting device comprising the steps of:
    applying a shaped voltage signal to the optical electrowetting device to tune the device by changing the shape of a liquid-liquid interface in the device;
    generating the shaped voltage signal by combining a first fast-rising voltage signal and a second, distinct, fast-rising voltage signal;
    wherein each fast-rising signal rises fast enough that it would cause an under-damped response in the electrowetting element on its own; and
    selecting the second signal such that it reduces the ringing cause by the first signal by more than three times.

14. The method of claim 13 further including the step of temporally offsetting the first signal and the second signal.

15. The method of claim 13 wherein one of the signals is a nonlinear signal.

16. The method of claim 13 wherein one of the signals is an exponential signal.

17. The method of claim 16 wherein both of the signals are nonlinear signals.

18. The method of claim 17 wherein both of the signals are exponential signals.

19. The method of claim 18 wherein the response time achieved by the method is improved over a method where the generating step uses a single exponential signal having the same rise time as the first fast-rising signal by at least 29%.

20. The method of claim 19 wherein the response time achieved by the method is improved over a method where the generating step uses a single exponential signal having the same rise time as the first fast-rising signal by at least 41%.

21. The method of claim 18 wherein the response time achieved by the method is improved over a method where the generating step uses a single exponential signal having a rise time of 15 ms by at least 29%.

22. The method of claim 19 wherein the response time achieved by the method is improved over a method where the generating step uses a single exponential signal having a rise time of 2 ms by at least 41%.

* * * * *